United States Patent
Armanino et al.

(10) Patent No.: US 7,388,948 B2
(45) Date of Patent: Jun. 17, 2008

(54) AMA ACCESS OVER LOCAL AUDIT ANALYSIS (AAOLA)

(75) Inventors: Frederick Michael Armanino, San Antonio, TX (US); Carol Mingst, San Ramon, CA (US); George Swinston McLain, Lafayette, CA (US); David Lewis Kimble, Danville, CA (US); John D. Estes, Pleasanton, CA (US)

(73) Assignee: SBC Knowledge Ventures, L.P., Reno, NV (US)

( * ) Notice: Subject to any disclaimer, the term of this patent is extended or adjusted under 35 U.S.C. 154(b) by 528 days.

(21) Appl. No.: 10/853,572

(22) Filed: May 25, 2004

(65) Prior Publication Data

US 2005/0276403 A1 Dec. 15, 2005

(51) Int. Cl.
*H04M 15/00* (2006.01)

(52) U.S. Cl. ............. 379/126; 379/114.14; 379/121.01; 379/127.02; 379/145

(58) Field of Classification Search ................. 379/111, 379/112.01, 114.01, 114.05, 114.28, 115.01, 379/115.02, 121.01, 121.05, 126, 127.01–127.02
See application file for complete search history.

(56) References Cited

U.S. PATENT DOCUMENTS

| | | | |
|---|---|---|---|
| 5,333,183 A * | 7/1994 | Herbert | 379/112.07 |
| 5,592,530 A * | 1/1997 | Brockman et al. | 379/32.03 |
| 6,173,051 B1 | 1/2001 | Lipchock et al. | |
| 6,205,210 B1 * | 3/2001 | Rainey et al. | 379/114.28 |
| 6,298,123 B1 * | 10/2001 | Nolting et al. | 379/111 |
| 6,363,141 B1 | 3/2002 | Stubing | |
| 6,650,633 B1 | 11/2003 | Albers et al. | |
| 6,721,405 B1 | 4/2004 | Nolting et al. | |
| 6,744,866 B1 | 6/2004 | Nolting et al. | |
| 6,782,085 B1 * | 8/2004 | Becker et al. | 379/126 |
| 6,891,938 B1 * | 5/2005 | Scott et al. | 379/112.06 |
| 7,254,109 B2 * | 8/2007 | Verma et al. | 370/217 |
| 2001/0012345 A1 * | 8/2001 | Nolting et al. | 379/112.01 |
| 2004/0161084 A1 * | 8/2004 | Lampell et al. | 379/111 |
| 2005/0047569 A1 * | 3/2005 | Moisey et al. | 379/126 |
| 2005/0094623 A1 * | 5/2005 | D'Eletto | 370/352 |

* cited by examiner

*Primary Examiner*—Binh K. Tieu
(74) *Attorney, Agent, or Firm*—Toler Law Group, Intellectual Properties

(57) ABSTRACT

A method of evaluating automatic message accounting records associated with telephony calls that originate at a local exchange carrier telephony office and that are routed over an inter-exchange carrier telephony facility is disclosed. The method comprises collecting originating automatic message accounting records associated with the originating local exchange carrier telephony office, and collecting terminating automatic message accounting records that correspond to the originating automatic message accounting records. A first portion of the terminating automatic message accounting records have a terminating access code and a second portion of the terminating automatic message accounting records have a local termination code.

18 Claims, 2 Drawing Sheets

AMA ACCESS OVER LOCAL AUDIT ANALYSIS (AAOLA)

BACKGROUND

1. Field of the Disclosure

The present disclosure relates generally to access over local telephony traffic detection.

2. Description of the Related Art

Under federal regulations, calls that are carried by inter-exchange carriers (IXC), and (including CLEC, INDP etc.) are assessed with access charges, that are payable by the IXC to the incumbent local exchange carrier (ILEC). The egress calls that originate from the ILEC network to the IXC network are assessed with an originating access charge while the ingress calls that terminate into the ILEC network from the IXC are assessed with a terminating access charge, both of which are payable by the IXC carrier. These access charges are part of a tariff rate structure that has been in effect since divestiture.

Recently, IXC carriers appear to have been routing traffic in such a manner as to avoid paying terminating access charges to ILEC carriers. This terminating access by-pass has a significant financial impact to the ILEC carriers and is considered a violation to standing tariffs. The IXC carriers have the capability to terminate this access traffic over local facilities through the use of CLEC affiliates and/or Less Cost Route (LCR) providers. ILEC providers refer to this type of traffic as Access-Over-Local.

Identifying and quantifying the extent of Access-Over-Local traffic is an ILEC revenue retention issue. Accordingly, there is a need for a method of detecting Access-Over-Local traffic.

DESCRIPTION OF THE DRAWINGS

A call originates from a subscriber that is connected to an ILEC (ILEC A) office and is recorded at that end office as an originating long distance call (using AMA call code 110) and routed to the long distance carrier. Once the call reaches its destination exchange, it is passed back to an ILEC (ILEC B) from the long distance carrier, recorded as a terminating long distance call (using AMA call code 119), and terminated to the called party through the ILEC B end office. Because of the recordings, each ILEC has the opportunity to bill the long distance carrier for their costs (called access charges) in placing and completing the call.

Figure 1:
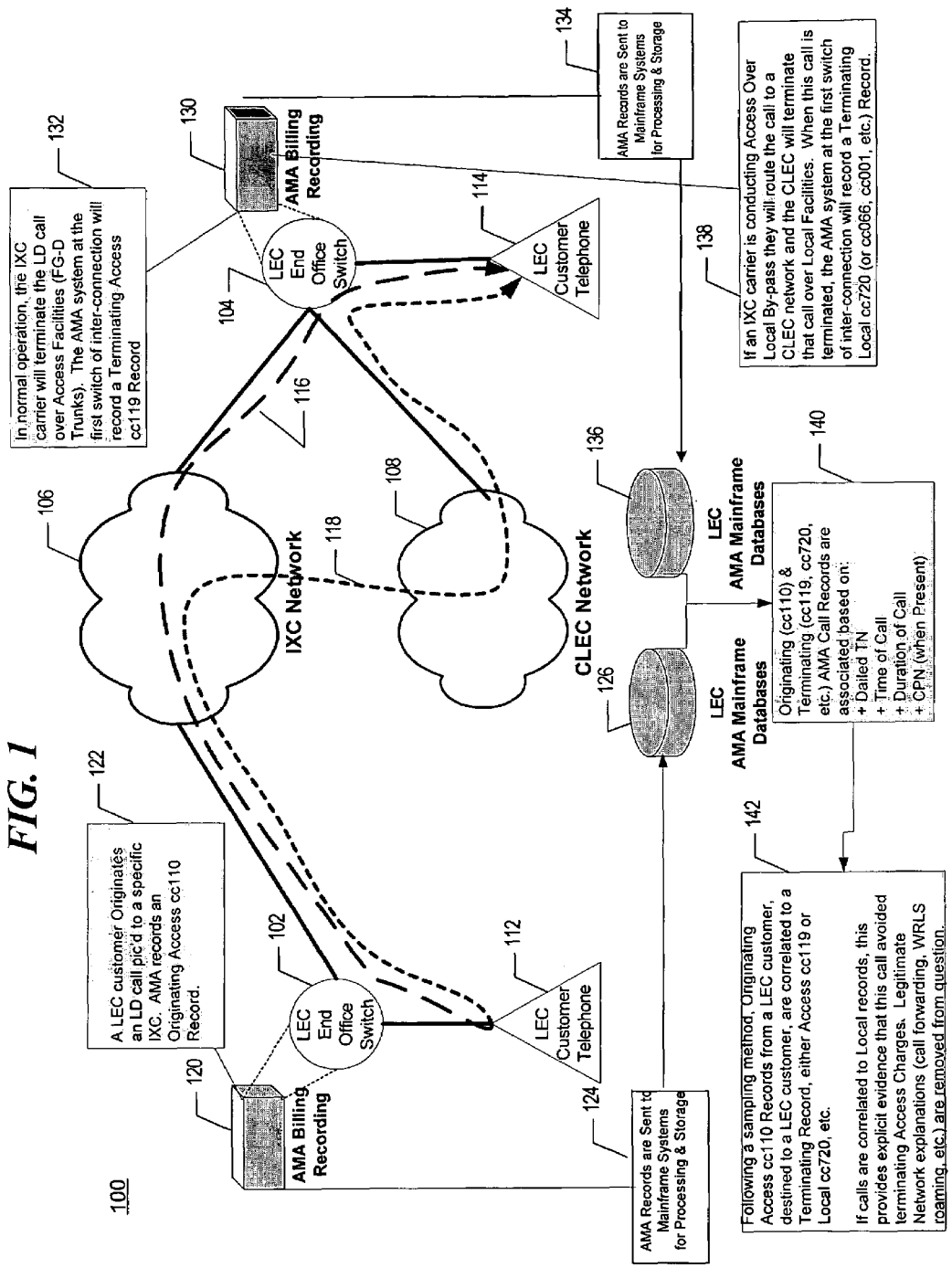
FIG. 1 is a general diagram that illustrates a system of monitoring SS7 links.

Referring to FIG. 1, a system 100 is illustrated. The system 100 includes a first end office switch 102, an inter-exchange carrier (IXC) Network 106, and a second end office switch 104. The first end office switch 102 is responsive to call requests from a customer telephone, such as the illustrated telephone 112. The first end office switch 102 is coupled to AMA billing and recording system 120. The first end office switch 102 is also connected via a CLEC Network 108 to the second end office switch 104. The second end office switch 104 is coupled to a terminating telephone such as customer telephone 114 and is coupled to a terminating AMA billing and recording system 130. The first AMA billing and recording system 120 collects AMA billing records and sends such records to AMA mainframe database 126. Similarly AMA billing and recording system 130 sends AMA billing records for the second end office switch 104 to the AMA mainframe database 136.

During operation, a customer of the first end office switch 102 at a customer telephone 112, initiates a call to be routed through the network. An example of a call is a long distance call that specifies a particular IXC carrier. As the call is routed through the first end office switch 102, AMA records having an originating access code (e.g. cc110) are stored in the AMA billing and recording system 120. The call is routed over the IXC network 106 along a call path to the second end office switch 104. In a particular embodiment, the call path may be routed from the IXC network 106 across a CLEC network 108 to the second end office switch 104. Thus, some calls are handled over the IXC network 106 and other calls are routed over an alternative network such as a CLEC network 108. In either case, terminating access charges at the end office switch 104 are proper for the inter exchange carrier as calls are terminated at the second end office switch 104 and routed to the final destination customer telephone 114. AMA billing records are recorded at the AMA billing recording system 130 for such calls. The AMA billing recording system 130 records a terminating access record, such as a cc119 record for archival. The terminating AMA records, such as the illustrated record 134, are stored at the AMA mainframe database 136.

The database records from AMA database 126 corresponding to originating call records and the records from database 136 corresponding to terminating call records are forwarded to correlation logic unit 140. The correlation logic unit 140 may be implemented by a software program executed on a computer that correlates originating and terminating AMA records based on a number of different criteria. For example, the originating and terminating records may be correlated based on dialed telephone number, time of day, duration of call and the calling party number, if present. The correlated originating and terminating records are then forwarded to evaluation logic 142 to classify calls based on the correlated records. The evaluation logic often provides evidence that certain calls may be deemed access over local calls, thereby detecting a failure of payment of terminating access charges under tariff rules. Further details regarding the correlation and evaluation logic used to compare originating and terminating records is described with respect to FIG. 2.

Figure 2:
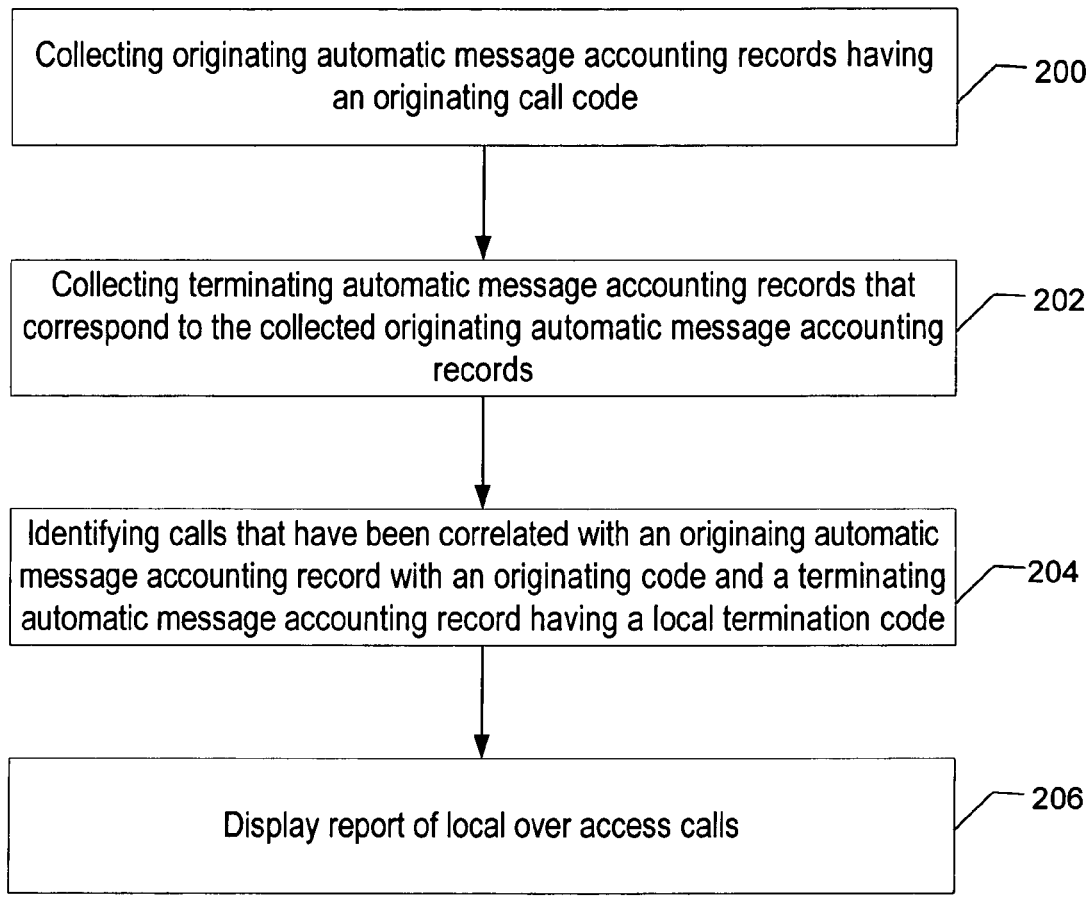
FIG. 2 is a flow chart that illustrates a method of operation relating to the system of FIG. 1.

Referring to FIG. 2, a method of correlating and evaluating call records to detect certain classes of calls are shown. Originating AMA records are collected, at 200. The originating AMA records have a particular originating call code, such as cc110. Terminating AMA records for the call are collected that correspond to the originally collected originating AMA records, as shown at 202. The terminating records have a particular termination code. Calls that have been correlated based on the originating AMA record having an originating code and a terminating AMA record having a terminating call code are identified, as shown at 204. Based on the correlation of the originating and terminating AMA records, a report is then displayed that identifies calls that have been reported as local over access calls, at 206.

As illustrated in FIG. 1, calls in which ILEC-A and ILEC-B (i.e. LEC 102 and LEC 104) are both operated by a common carrier may be analyzed since the originating and terminating AMA Records are accessible. Correlation of these records allows the disclosed method to distinguish between calls that legitimately terminate at local trunk groups vs. those calls that originated as access calls yet are being dumped as local calls to avoid access charges on the terminating end (i.e. local over access calls). An example of the AMA audit and evaluation method follows:

1. Originating AMA call code 110 (cc110) Billing Records are collected over a period of time (e.g. 1 Day to x Days) based on a variety of conditions including those determined by the following study criteria and Sample Model Size:
   a. Calls That Originate from an ILEC customer and
   b. Calls that are destined to an ILEC customer (based on NPANXX of dialed Number) and
   c. Calls PIC'd to a specific Access Carrier and/or
   d. Calls that have a greater duration then "x" seconds. (varied for system performance considerations)
2. Terminating office AMA Billing Records are collected including both Access cc119 records as well as Local Terminating records, such as cc720 coded records. These terminating AMA records are extracted based on the condition that they terminate to the same dialed telephone number as the Originating cc110 records collected in step 1 over the same time period.
3. The Originating cc110 records are then correlated to the Terminating Access (cc119) and Local (e.g. cc720) records based on the following parameters:
   a. DIALED TELEPHONE NUMBER
   b. CALL TIMESTAMP
   c. CALL DURATION
   d. CALLING PARTY NUMBER (CPN) (if provided) (the correlation can be conducted in the absence of a CPN or if the CPN has been changed for fraudulent reasons)
4. Three types of conclusions can then be reached:
   a. Calls that have been correlated with an Originating Access cc110 record and a Terminating Access cc119 record are considered ACCESS to ACCESS calls and signify "above board" practices with the ILEC being compensated as expected. This identifies a first set of calls.
   b. Calls that have been correlated with an Originating Access cc110 record and a Terminating Local record, are considered ACCESS-OVER-LOCAL calls and signify that the IXC carrier is by-passing Terminating Access Charges. This identifies a second set of calls.
   c. Originating Access cc110 calls that have NOT been correlated are considered NO MATCH calls and signify potential fraud in the form of terminating Access calls over PRI circuits that do not generate AMA billing records. This is a third set of calls that are suitable for further investigation.

The disclosed system and method takes advantage of an ILEC's existing AMA Billing system to provide audit coverage without having to invest in new supporting infrastructure and provides for detailed auditing analysis to identify Access Over Local calls.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of evaluating automatic message accounting records associated with telephony call traffic, the method comprising:
   collecting originating automatic message accounting (AMA) records having an originating call code that identifies the record as an originating long distance call;
   collecting terminating automatic message accounting (AMA) records that correspond to the collected originating automatic message accounting records; and
   identifying calls that have been correlated with an originating automatic message accounting record with an originating code and a terminating automatic message accounting record having a local termination code in order to determine that the calls are fraudulent absent legitimate explanations.

2. The method of claim 1, wherein a first portion of the terminating automatic message accounting records have a local termination code and a second portion of the terminating automatic message accounting records have a terminating access code.

3. The method of claim 1, wherein the identified calls are reported as access over local call.

4. The method of claim 3, wherein the access over local calls are identified by a local exchange carrier as calls that bypass terminating access charges.

5. The method of claim 3, wherein the access over local calls are identified as fraudulent calls.

6. The method of claim 1, wherein the originating automatic message accounting records are correlated with the terminating automatic message accounting records based on dialed telephone number, call timestamp, and call duration information.

7. The method of claim 6, wherein calling number party information is also used to perform the correlation.

8. The method of claim 2, wherein the local termination code is cc720.

9. The method of claim 2, wherein the originating call code is cc110.

10. The method of claim 1, further comprising displaying a report that identifies the identified calls.

11. The method of claim 10, wherein the report further identifies terminating access charges associated with the identified calls.

12. The method of claim 1, wherein the originating automatic message accounting records are collected at a first telephony office and the terminating automatic message accounting records are collected at a second telephony office.

13. The method of claim 12, wherein the first telephony office and the second telephony office are both controlled by a common operating entity and wherein the identified calls are routed from the first telephony office to an inter-exchange office that is controlled by another operating entity.

14. A method of evaluating automatic message accounting records associated with telephony calls tat originate at a local exchange carrier telephony office and that are routed over an inter-exchange carrier telephony facility, the method comprising:
   collecting originating automatic message accounting records associated with the originating local exchange carrier telephony office; and
   collecting terminating automatic message accounting records that correspond to the originating automatic message accounting records;
   wherein a first portion of the terminating automatic message accounting records have a terminating access code and a second portion of the terminating automatic message accounting records have a local termination code.

15. The method of claim 14, further comprising identifying a first set of calls where the originating automatic message accounting records correlate with the first portion of the terminating automatic message accounting record having the terminating access code.

16. The method of claim 15, further comprising identifying a second set of calls where the originating automatic message accounting records correlate with the second portion of the terminating automatic message accounting record having the local termination code.

17. The method of claim 16, further comprising identifying a third set of calls where the originating automatic message accounting records do not correlate with either the first portion of the terminating automatic message accounting records nor the second portion of the terminating automatic message accounting records.

18. The method of claim 17, wherein the second set of calls and the third set of calls are identified as potentially fraudulent calls.

* * * * *